United States Patent [19]
Kemp, Jr.

[11] 3,988,026
[45] Oct. 26, 1976

[54] SELF-COMPENSATING ROTARY SEAL MEMBER

[76] Inventor: Dennis E. Kemp, Jr., P.O. Box 167, South Orange, N.J. 07079

[22] Filed: Feb. 27, 1976

[21] Appl. No.: 662,277

[52] U.S. Cl. .................................... 277/4; 277/65; 277/83
[51] Int. Cl.² ........................................ F16J 15/34
[58] Field of Search ............... 277/4, 35, 37, 39, 65, 277/83

[56] References Cited
UNITED STATES PATENTS

| | | | |
|---|---|---|---|
| 2,189,686 | 2/1940 | Stevenson | 277/4 |
| 2,367,403 | 1/1945 | Kosatka | 277/39 |
| 2,561,694 | 7/1951 | Gilbert | 277/39 |
| 2,586,739 | 2/1952 | Summers | 277/83 |
| 2,853,020 | 9/1958 | Hollinger et al. | 277/65 |
| 3,015,505 | 1/1962 | Smith | 277/65 |
| 3,268,232 | 8/1966 | Richards | 277/83 |
| 3,442,516 | 5/1969 | Voitik | 277/39 |

FOREIGN PATENTS OR APPLICATIONS

| | | | |
|---|---|---|---|
| 512,372 | 9/1939 | United Kingdom | 277/83 |

Primary Examiner—Robert I. Smith
Attorney, Agent, or Firm—Mark T. Basseches; Paula T. Basseches

[57] ABSTRACT

The present invention relates to a self-compensating rotary seal member such as is used in low pressure applications, i.e. where a drive shaft extends through a container wall. The seal member is characterized by an elastomeric collar member mounted on the drive shaft within a housing, the ends of the collar being in frictional driving connection with a spaced pair of thrust washers, the washers in turn being yieldingly pressed against wear plates formed of material having a low coefficient of friction. Sealing is effected in a direction axially of the shaft by the interfit of the collar about the shaft, and in the direction normal to the axis by the frictional and rotary engagement of the thrust washers against portions of the wear plate or plates surrounding the shaft and disposed at the ends of the housing. Since the seal, in a radial direction, is effected between surfaces aligned normal to the direction of rotation of the shaft, substantial degrees of eccentricity can be accommodated, as can a degree of tilting of the shaft relative to the housing.

9 Claims, 2 Drawing Figures

SELF-COMPENSATING ROTARY SEAL MEMBER

BACKGROUND OF THE INVENTION

1. Field of the Invention

The present invention is in the field of rotary seals for low pressure applications. A particular area of utility for the seal of the instant invention is to isolate the interior of a mixing container, feed auger assembly or the like from the motor or other means for applying rotary power therefor.

2. The Prior Art

Numerous means have been suggested for forming rotary seals for a drive shaft extending through the wall or casing of a container or feed device to prevent the escape of dust, pulverulent material or the like.

In accordance with one form of seal, waste or packing material which may be suitably impregnated with a lubricant is mounted in a gland extending through the wall of the container. The effectiveness of the seal against the passage of detritus is directly proportional to the forces with which the waste material is compressed against the periphery of the shaft. Such devices are disadvantageous on many counts, including extremely high starting torque, being six to seven times the running torque. Additionally, such rotary seals must be frequently adjusted to compensate for wear and maintain the pressure of the packing against the shaft within a predetermined range. Further, lubrication on the packing often contaminates the material within the container and entraps material which, where the same is abrasive, results in accelerated wear on the shaft.

It is, for instance, necessary to readjust a standard packing gland, in a typical application, after each one hundred to two hundred hours of use, and a complete change of packing must be effected about every three months. Naturally, the frequency of adjustment and replacement of packing will vary from installation to installation, depending in a measure on the nature of the pulverulent material with which the rotary seal is contacted.

A further drawback of conventional low pressure rotary seals lies in their inability to compensate for eccentricities or axial misalignments between the drive shaft and other components, and where such inaccuracies exist, the starting torque and wear rates are dramatically increased.

SUMMARY

The present invention may be summarized as directed to an improved self-compensating rotary seal which may be readily endwisely assembled onto an existing shaft installation, which is highly resistant to the passage of pulverulent material, dust or the like, which does not materially increase the starting torque of the device, which does not require frequent readjustment, and which automatically compensates for a degree of eccentricity and axial misalignment of the drive shaft.

The device includes a housing, one end of which is adapted to be connected to the wall to be sealed. A pair of end plates incorporate coaxially disposed apertures, oversized as respects the drive shaft. A pair of wear plates are disposed adjacent the end plates of the housing, the wear plates having apertures aligned with the apertures in the end plates, the wear plate apertures, like the end plate apertures, being oversized as respects the shaft.

A collar is mounted about the shaft, the collar being formed of elastomeric material having a high coefficient of friction. An end thrust washer or washers of metallic material are frictionally engaged by the ends of the collar and are gently urged against the wear plates, which are preferably formed of low friction polymeric material, such as nylon or an ultra high density polyethylene.

Spring means may be employed gently to urge the wear plate or plates against the washer or washers, and the washers against the ends of the collar, which latter is tightly sleeved over and frictionally carried for rotation with the shaft.

The coefficients of friction of the various components are selected so that the collar causes the washers to rotate while the same are in contact with the wear plates, providing an effective seal notwithstanding there is minimum pressure in an axial direction between the various components. Since the seal between the washer and the wear plates is effected at a radial contact area surrounding the apertures of the end plates and wear plates, substantial eccentricity of the shaft can be accommodated without binding and without loss of sealing effect.

Accordingly, it is an object of the present invention to provide an inexpensive, long lived and effective rotary seal member.

It is a further object of the invention to provide a seal member of the type described which is self-compensating, accommodating substantial eccentricity and axial misalignment of the drive shaft, and likewise automatically compensating for wear of the components.

To attain these objects and such further objects as may appear herein or be hereinafter pointed out, reference is made to the accompanying drawings, forming a part hereof, in which.

Figure 1:
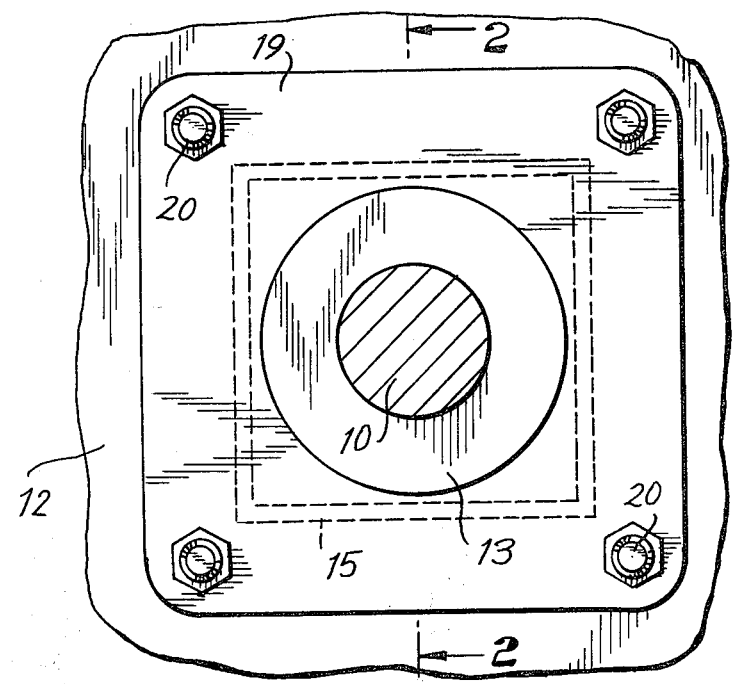
FIG. 1 is a cross sectional view taken in the direction normal to the axis of the drive shaft.

As conductive to an understanding of the present seal device, the same has been shown in use with an auger feed apparatus, it being understood that the utility of the device is by no means limited for such purpose.

A drive shaft 10 fixed to an auger 11 passes through wall 12 of the auger feed assembly, the shaft, in addition, passing through a bearing member, shown diagrammatically at 13, the outer race of which may be mounted to some portion of the frame. The rotary seal member is shown generally at 14 and includes a housing 15 which, by way of example, may be square in vertical section.

The housing includes outwardly directed, square perimetal attachment flanges 16, 17. Inner and outer end plates 18, 19, respectively are secured to the flanges. The inner plate 19 is secured to flange 16 as by bolts 20. Bolts 21, in similar fashion, secure the inner end plate 18 to the flange 17, the bolts 21 in addition being preferably of sufficient length to extend through apertures 22 in the wall 12 of the container, whereby the seal assembly may be mounted to the container wall. Obviously, other mounting arrangements are feasible.

Figure 2:
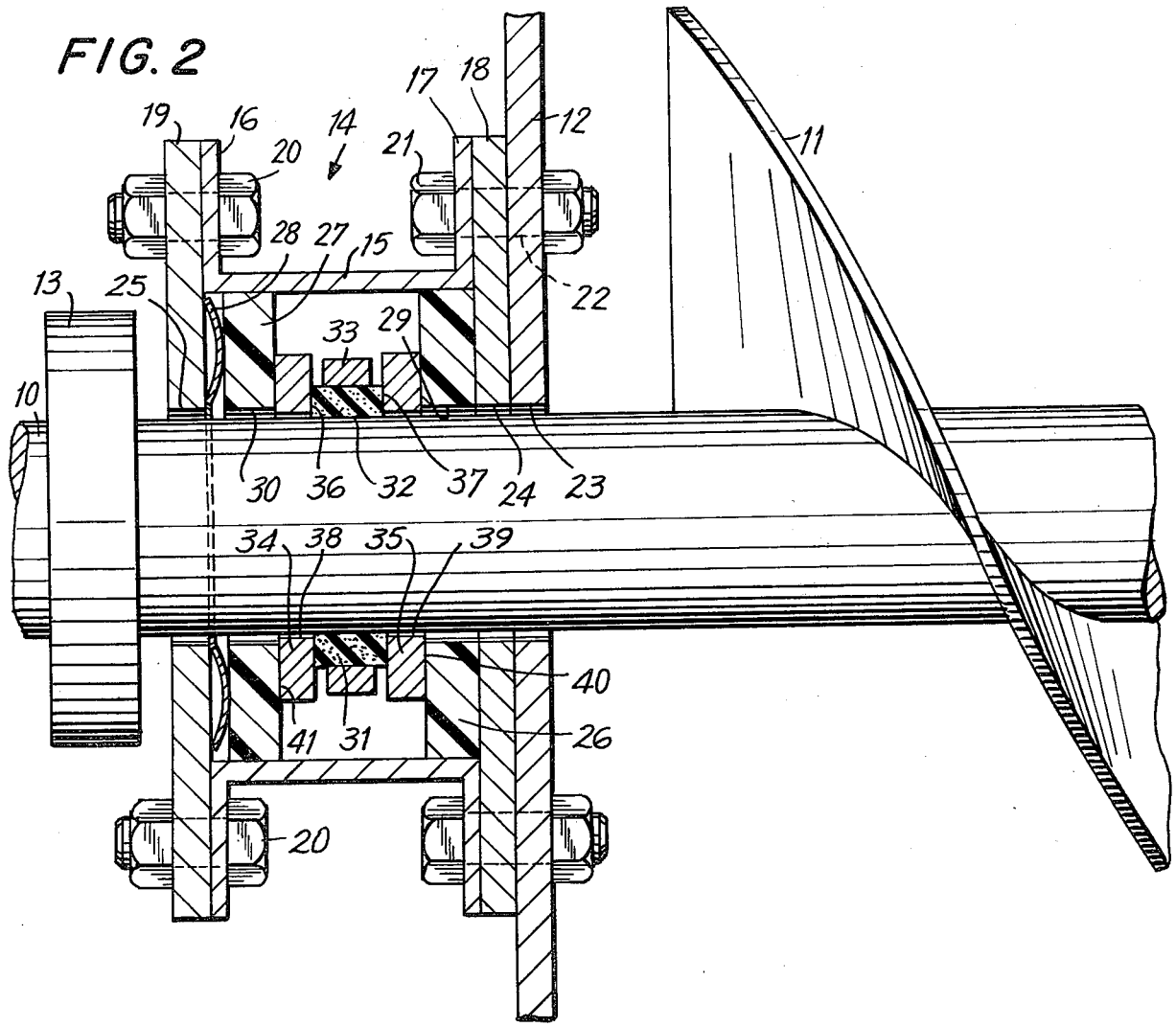
FIG. 2 is a section taken on the line 2—2 of FIG. 1.

As will be apparent from an inspection of FIG. 2, the container wall 12 is provided with a through-going aperture 23 which is aligned with apertures 24 and 25 in the end plates 18, 19, respectively.

As illustrated, the apertures 23, 24, 25 are sized to provide substantial clearances in a radial direction about the shaft 10, whereby the shaft may rotate without interference, notwithstanding a degree of eccentricity or axial tilting of the shaft relative to the axes of the apertures.

Internally of the seal housing 15, there is provided an inner wear plate 26, the outer configuration of which corresponds closely to the cross sectional dimension of the housing. A similar wear plate 27 is disposed within the housing adjacent the outer end plate 19.

The plates 26, 27 are formed of material having a low coefficient of friction, which is relatively soft, preferably a polymeric material such as nylon, ultra high density polyethylene or a nylon-acetyl resin sold by DuPont Corporation under the trademark DELRIN.

Optionally and preferably, a phosphor bronze or like spring member 28 is interposed between the end plate 19 and a wear plate 27, the spring 28 functioning to urge the plate 27 gently in the direction of the wall 12. It will be readily recognized that while only a single such spring has been disclosed, a similar spring may be interposed between the wear plate 26 and the inner end plate 18.

The wear plates 26, 27 are provided with axially directed apertures 29, 30, respectively, said apertures, as is the case with the apertures 23, 24, 25, providing clearance with respect to the shaft 10.

A drive collar 31 is disposed within the housing 15, the collar 31 being preferably formed of an elastomeric material, i.e. neoprene, latex, etc., which is elastically deformable and has a high coefficient of friction. The internal diameter 32 of the collar is sized to provide an intimate fit about the shaft 10. Due to the elastic nature of the material 31, a relatively tight gripping of the slightly distended collar about the shaft is effected while at the same time providing a degree of axial shiftability between the noted parts.

Preferably an annular metal band 33 may be mounted about the collar 31, the band functioning to prevent substantial distortion of the shape of the collar in the course of rotation and, as desired, assuring a snug fit of the collar about the shaft.

A pair of thrust washers 34, 35 are interposed between the driving end portion 36 of the collar and the wear plate 27 on the one hand, and the other driving end portion 37 of the collar and the inner wear plate 26 on the other hand. Preferably, the washers float between the collar and the wear plates, to provide maximum ability to compensate for axial misalignment of the drive shaft. However, the washers may be bonded to the collar without entirely losing the desired compensation provided the collar has sufficient elasticity to permit deflection of the plane of the washers from perpendicularity with the shaft axis. The washers are provided with central apertures 38, 39, respectively, loosely surrounding the shaft 10.

The seal assembly may be positioned over the shaft 10 by removing the shaft from the bearing and drive and shifting the same axially over the shaft either by moving the seal over a stationary shaft or shifting the shaft through the seal.

It will be appreciated that when motive power is applied to the shaft 10, the auger 11 will be rotated and pulverulent material disposed within the auger side of the wall 12 may tend to escape outwardly from the wall in the direction of the seal. It will be readily recognized that egress of the pulverulent material, dust, etc. in an outward direction is limited principally by the contacting surface at the junction 40 between the washer 35 and the wear plate 26.

Preferably at least the wear face engaging surface of the washers 34, 35 is polished.

In the course of rotation of the shaft 10, the washers 34, 35 will be caused, by virtue of their contact with the high coefficient of friction material of the collar 31, or by bonding, to be carried with and rotate along with the shaft. An extremely effective seal against discharge through the junction area 40 has been found to have been created by the rotating washer against the wear plate 26.

A similar seal in the junction area 41 exists between the washer 34 and the wear plate 27.

Due to the high coefficient of friction of the collar and the low coefficient of friction of the wear plates 26, 27, the washers 34, 35, although preferably floating, are driven with the shaft and there is no relative rotation between the washers and the collar 31.

Unexpectedly the sealing effect achieved at the junctions 40, 41 is essentially independent, within a reasonable range, of the pressure with which the washers are exerted against the wear plates. I have discovered that an axial pressure of only a pound, for instance, provides as effective a seal as substantially greater pressures without incurring a disadvantageous increase in the torque required to initiate rotation of the auger.

A seal against movement of material in a direction axially beyond the collar 31 is, of course, effected by the intimate engagement of the collar about the shaft on the one hand, and the engagement of the end or drive faces 37, 36 with the washers 25, 24 on the other hand.

It will be further noted that there is no significant tendency of the seal to bind, notwithstanding eccentricity of the shaft with respect to the seal, since the shaft is free to move within the over-sized apertures 23, 24, 25, 29 and 30. Such eccentric movement does not, however, compromise the sealing effect, which is performed in a radial direction. If the eccentricity is small, the washers 34, 35 are not bodily moved except in a rotary direction. If the eccentricity is larger, washers 34, 35 may be moved in a direction transverse to the axis of rotation but such movement is accommodated by the parallel engaging faces at the junctions 40 and 41 between the washers and wear plates.

Preferably, the area of engagement between the floating thrust washers and wear plates is about one and one half to two and one half times the area of engagement between the collar and the washers. Departures from this range are obviously feasible, it being necessary that the area relationship be such that the collar causes the washer to rotate relative to the wear plate rather than a relative rotation being experienced between the collar and washer. In practice, the surfaces of the washers which engage the wear plates should be polished.

An important feature of the invention is considered to reside in the ability of the device to maintain a sealed condition notwithstanding departures of the drive shaft from precise alignment with the seal axis. Such capability results from the elastically deformable collar maintaining the thrust washers in engagement with the wear plate or plates, the elasticity of the collar continuously compensating for slight tilting of the drive shaft axis relative to a line perpendicular to the wear plates.

A greater degree of compensating effect is realized where the washer floats, i.e. is biased against the wear plate by the collar without attachment to the collar, than is the case where the washer is bonded to the collar. However, even in the latter case, the washer may be tilted, to a degree, by virtue of the resilient elasticity of the collar.

While it is preferred that the device include a pair of washer plates and a pair of thrust washers pressed against the wear plates by the axial end portions of the collar, the benefits of the invention, to a degree, may be realized utilizing a single wear plate and washer driven by the collar adjacent the wall of the container to be sealed. In such case, the collar may be positively precluded from shifting by a shoulder or other stop on the shaft.

It will be apparent from the foregoing that other and further variations in constructional details may be made by those skilled in the art who have been acquainted with the teachings hereof. Accordingly, the invention is to be broadly construed within the scope of the appended claims.

Having thus described the invention and illustrated its use, what is claimed as new and is desired to be secured by Letters Patent is:

1. A low pressure, self-compensating rotary seal member mountable over a drive shaft comprising, in combination, a housing including first and second parallel end plates, a shaft clearance aperture formed in each said end plate, said apertures being disposed in coaxial alignment, first and second wear plates within said housing adjacent said first and second end plates, respectively, said wear plates being formed of polymeric material of a low coefficient of friction, the faces of said wear plates remote from said end plates being planar and disposed normal to the axis of said apertures, said wear plates including shaft clearance apertures in alignment with the clearance apertures of said end plates, a deformable, elastic, radially and axially expansible tubular drive collar mountable over said shaft, said collar being formed of elastomeric material having a high coefficient of friction, the inner diameter of said tubular collar being less than the diameter of said clearance apertures and being sized frictionally to engage and rotate with said shaft, and first and second free floating metal thrust washers disposed between the opposite ends of said collar and said parallel faces of said first and second wear plates, respectively, said washers including internal clearance apertures larger than the outside diameter of said shaft, and being in frictional contact with said ends of said collar and said wear plates, the frictional drag between said collar and washers being greater than that between said washers and wear plates whereby, on rotation of said shaft, said washers are rotated relative to and yieldingly biased against said faces of said wear plates.

2. A seal member in accordance with claim 1 wherein said thrust washers are tiltable relative to the axis of said collar against the axial biasing force of said collar, whereby said washers are maintained in parallel engagement with said wear plates during rotation of said shaft notwithstanding tilting of the axis of said shaft from the axis of said apertures.

3. A seal member in accordance with claim 1 and including spring means interposed between at least one said end plate and a said wear plate for yieldingly urging said wear plate against a said washer.

4. A seal member in accordance with claim 1 wherein said collar is elongated in an axial direction and includes a radially inextensible band portion surrounding central portions of said collar.

5. A seal member in accordance with claim 1 wherein said thrust washers include a polished surface adjacent said wear plate.

6. A seal member in accordance with claim 1 wherein said drive collar is movable axially along said shaft, whereby said seal may be assembled over said shaft at a first position and advanced to a second position.

7. A seal member in accordance with claim 6 and including spring means within said housing for biasing said wear plates against said thrust washers.

8. A low pressure, self-compensating rotary seal member comprising a housing including an end plate, a shaft clearance aperture formed in said end plate, a wear plate mounted within said housing adjacent said end plate, said wear plate being formed of polymeric material of a low coefficient of friction, the face of said wear plate remote from said end plate being planar and disposed normal to the axis of said aperture, said wear including a shaft clearance aperture in alignment with the aperture in said end plate, a deformable, elastic, radially and axially extensible tubular drive collar adapted to be mounted on a drive shaft for rotation therewith, a thrust washer disposed between an end of said collar and said wear plate, said washer including an internal clearance aperture larger than the outside diameter of said shaft whereby said washer may be tilted relative to said shaft, said washer being yieldingly supported in slidable contact with said wear plate by said collar, said collar maintaining said washer in parallel sealing relation to said wear plate as said drive shaft is rotated.

9. A low pressure, self-compensating rotary seal member in accordance with claim 8 wherein said thrust washer is free of connection to said collar, the drag forces between said collar and washer being greater than the drag forces between said washer and wear plate whereby, upon rotation of said shaft, said washer is caused to rotate relative to said wear plate.

* * * * *

UNITED STATES PATENT OFFICE
CERTIFICATE OF CORRECTION

PATENT NO. : 3,988,026
DATED : Oct. 26, 1976
INVENTOR(S) : DENNIS E. KEMP, JR.

It is certified that error appears in the above–identified patent and that said Letters Patent are hereby corrected as shown below:

Column 6, line 35, after "wear" insert --plate--.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks